Oct. 7, 1952 — O. R. BREKLE — 2,612,912
MACHINE FOR STRAIGHTENING AND CUTTING WIRE
Filed Aug. 26, 1948 — 3 Sheets-Sheet 1
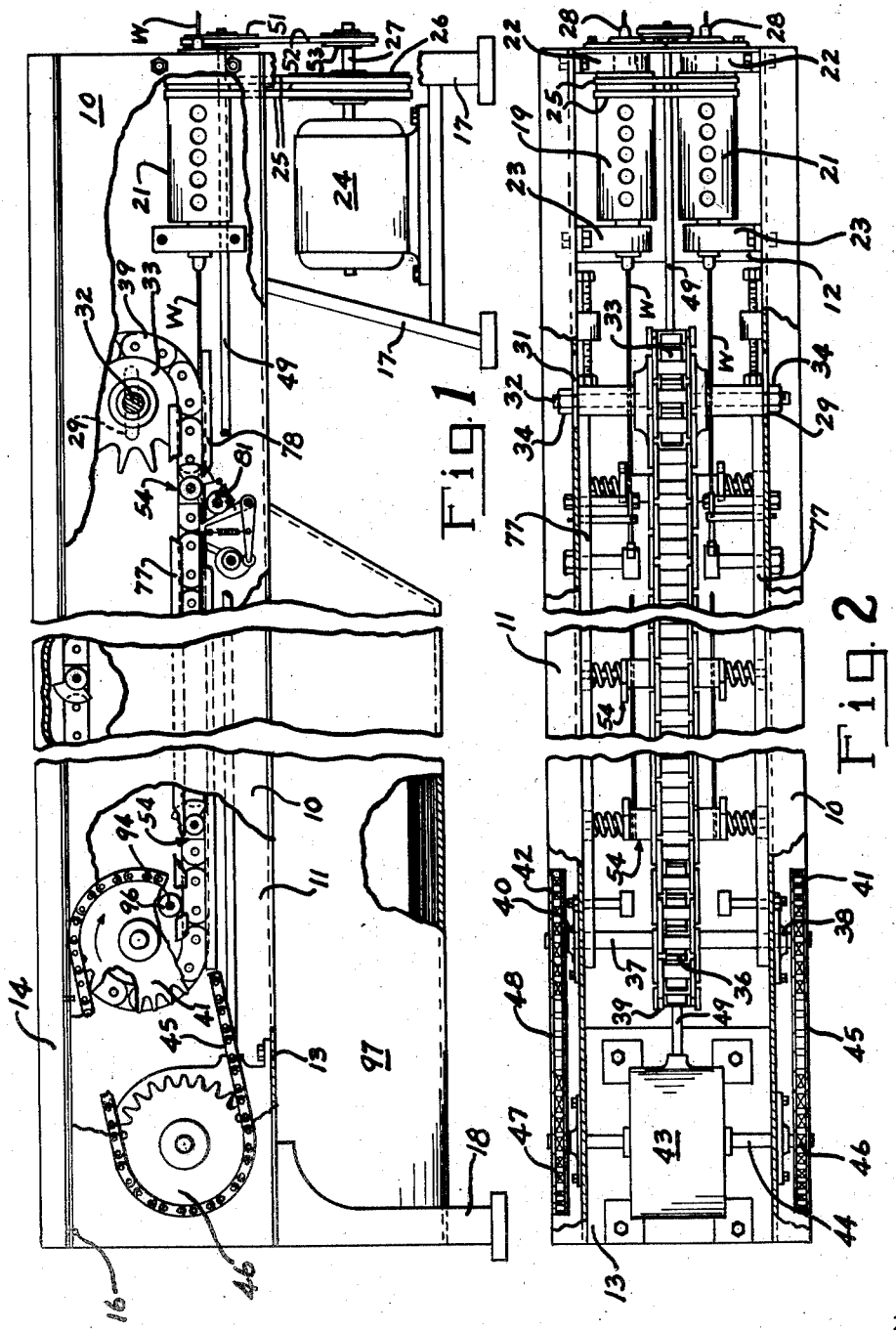
Inventor
OLIVER R. BREKLE
By Jennings & Carter
Attorneys

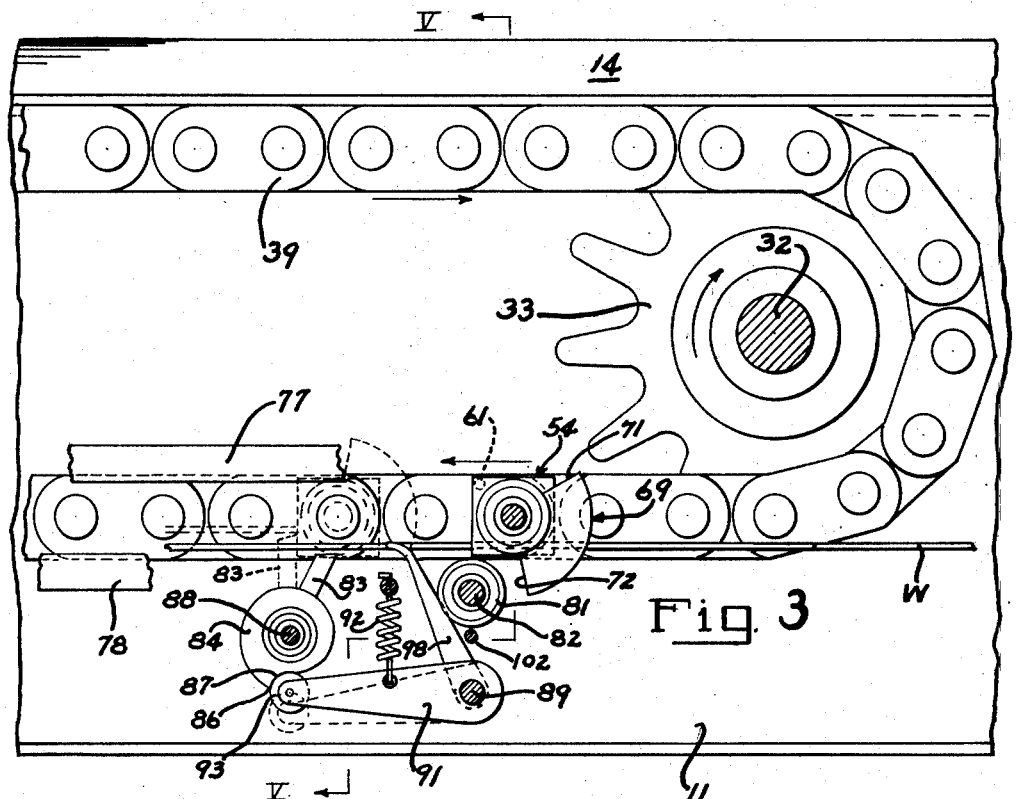
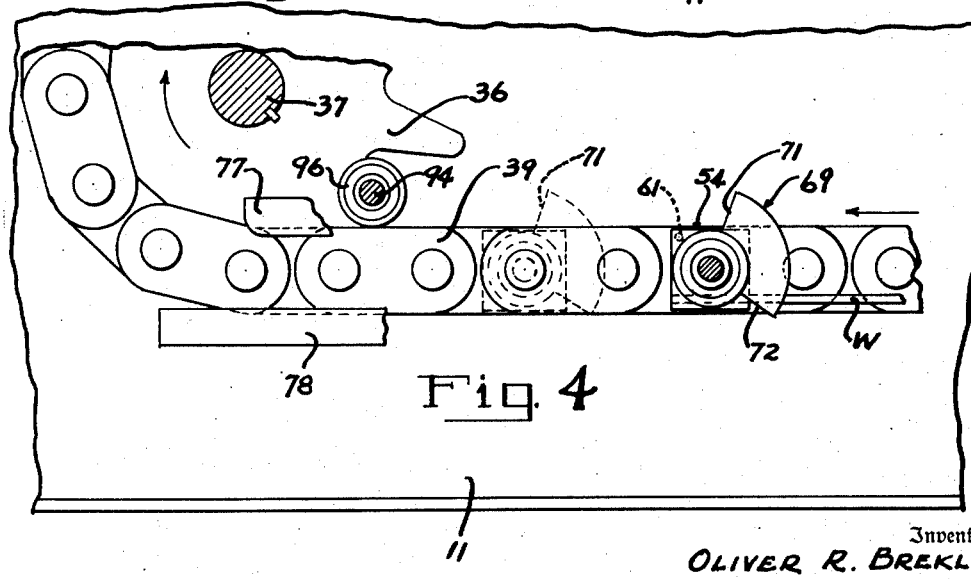

Oct. 7, 1952 — O. R. BREKLE — 2,612,912
MACHINE FOR STRAIGHTENING AND CUTTING WIRE
Filed Aug. 26, 1948 — 3 Sheets-Sheet 3
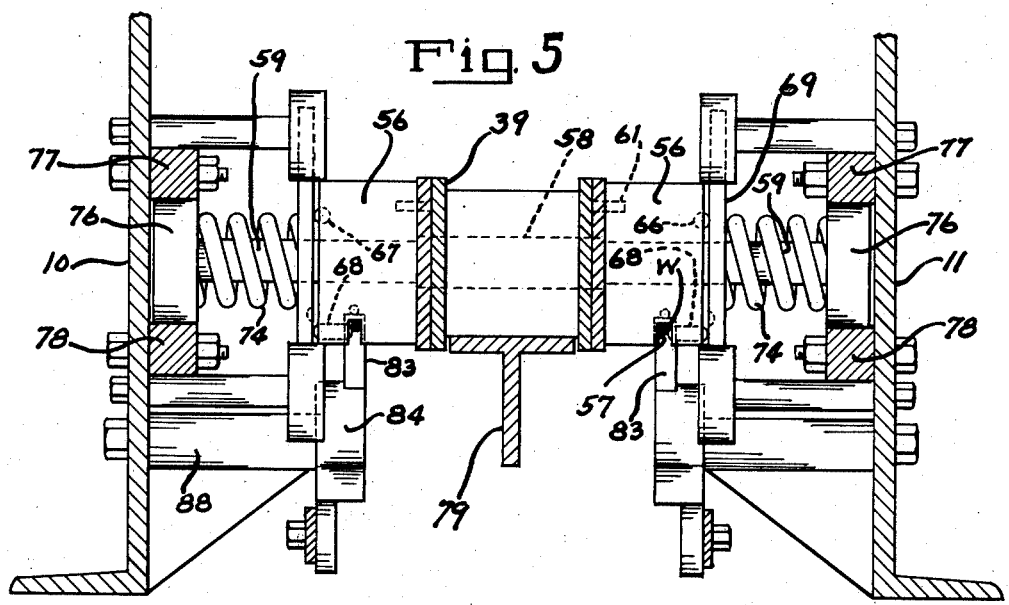
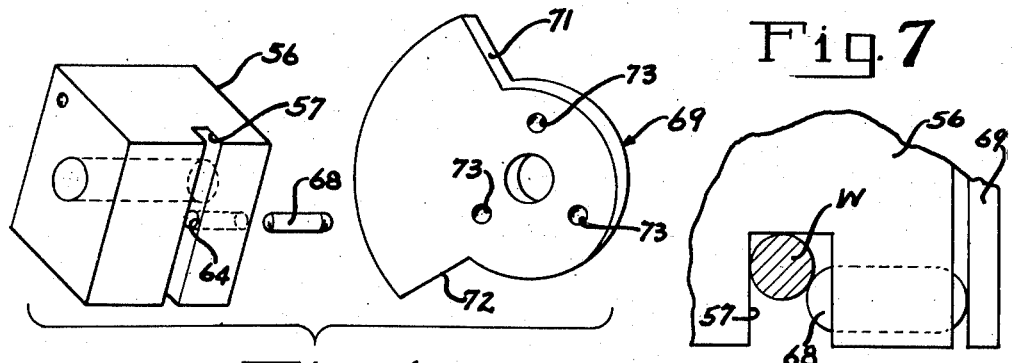
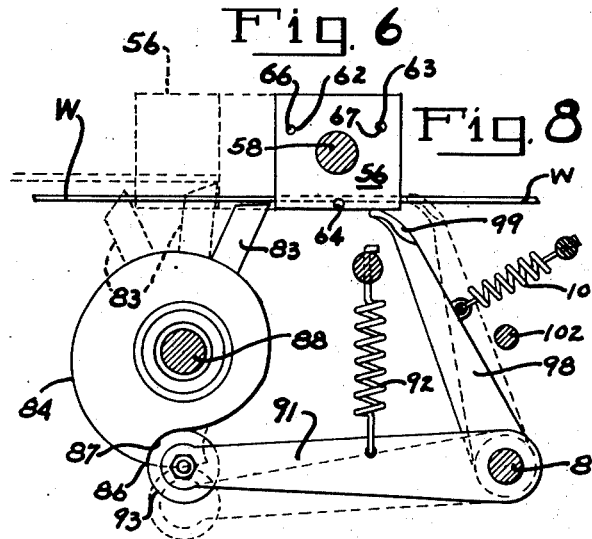
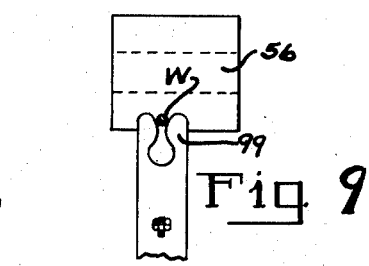
Inventor
OLIVER R. BREKLE
Jennings & Carter
Attorneys Patented Oct. 7, 1952

2,612,912

UNITED STATES PATENT OFFICE 2,612,912

MACHINE FOR STRAIGHTENING AND CUTTING WIRE

Oliver R. Brekle, Birmingham, Ala., assignor to M and B Metal Products Company, Birmingham, Ala., a partnership Application August 26, 1948, Serial No. 46,295

8 Claims. (Cl. 140—140)

My present invention relates to apparatus for straightening and cutting wire into predetermined lengths, as for instance to form blanks for the manufacture of wire garment hangers, and has for an object the provision of apparatus of the character designated which shall cut a length of wire from a straightened end of a continuous length of wire drawn from a roll, and while the wire is in motion.

In the art to which my invention relates, wire straightening and cutting machines heretofore have been proposed which are operable to cut predetermined lengths of wire from a strand after the same is drawn through a rotatable straightening arbor. Such machines have embodied rollers to pull the wire through the arbor and the cutting action was controlled by the end of the wire causing the engagement of a clutch, which in turn actuated or engaged a form of cutter. During the actual cutting operation, the axial movement of the wire through prior machines was interrupted, resulting in a scoring of the wire by the rotating arbor, and a slipping of the feed rollers on the wire. As a consequence of these complicated and interrelated motions, prior art machines have had very low capacity, have been difficult to keep in repair, and generally have not been satisfactory to produce large quantities of relatively short lengths of wire needed in manufacturing such items as wire garment hangers.

It is a prime object of my invention, therefore, to provide apparatus of the character designated embodying a flexible member carrying releasable wire gripping elements to pull the wire through the straightening arbor, and disposed to engage and disengage the wire at the proper time while the flexible member and wire are in motion, together with a cutter or shear disposed to cut the wire immediately ahead of the forwardmost gripper, thus to cut a section of wire having a length determined by the spacing of the grippers.

A more specific object of my invention is to provide a cutter embodying a shearing blade mounted for rotation on a spirally contoured body member, and a roller spring biased into contact with the spiral surface of the body member to position the blade for cutting and also to cause rotation of the body and blade, thereby to reset the blade after each cutting operation.

Further objects are to mount sets of grippers and cutters on either side of a flexible member such as a chain whereby the apparatus cuts six sections of wire at each revolution of the chain; to reduce the overall size of the machine without sacrificing capacity or strength; to provide a spring biased guide member operable to assure that the free end of the wire is correctly positioned and in the wire gripping units; and in general to provide wire straightening and cutting apparatus which shall be more effective for its intended purposes than have prior apparatus of this character.

Apparatus embodying the features of my invention is illustrated in the accompanying drawings forming a part of this application in which—

Fig. 1 is a side elevational view of my improved apparatus partly broken away and in section;

Fig. 2 is a plan view partly broken away and in section;

Fig. 3 is an enlarged fragmental sectional view taken adjacent the feed end of the apparatus;

Fig. 4 is an enlarged fragmental sectional view taken adjacent the discharge or wire releasing end of the apparatus;

Fig. 5 is a detailed sectional view taken generally along line V—V of Fig. 3;

Fig. 6 is an exploded perspective view of one of wire gripping units with certain parts omitted for the sake of clarity;

Fig. 7 is fragmental sectional view drawn to an enlarged scale and illustrating the engagement of the pin with the wire in one of the wire gripping units;

Fig. 8 is a detailed sectional view illustrating the action of the cutter in cutting the wire; and Fig. 9 is a fragmental detail view of the upper end of wire positioning member.

Referring now to the drawings for a better understanding of my invention, my improved apparatus may embody a frame comprising channels 10 and 11, spaced apart and with the flanges thereof outturned. The channels are cross connected by plates 12 and 13 at the forward and rear ends respectively, and by other cross bracing members eliminated from the drawing for the sake of clarity. The entire top of the machine may be enclosed by means of a cover 14, held in place by means of dowels 16, passing through suitable holes in the upper flanges of the channels 10 and 11. The frame may be supported by legs 17 and 18.

At the forward or feed end of the apparatus are a pair of rotating wire straightening arbors 19 and 21, supported in front bearings 22 and rear bearings 23, bolted to the frame members 10 and 11. In the manner well understood, the arbors 19 and 21 are provided with staggered dies of hard material such as tungsten carbide through which the wire is drawn to straighten the same.

The arbors 19 and 21 are rotated by means of a motor 24, carrying a double grooved pulley 26 on the shaft 27 thereof, and driving the arbors through the medium of V-belts 25. Strands of wire W from separate sources, for instance, from rolls, not shown, are fed to the arbors 19 and 21 through guides or trumpets 28.

Mounted in slotted openings 29 and 31 formed in the vertically disposed bases of the channels 10 and 11 are the threaded ends of a shaft 32. Rotatably mounted adjacent the center of the shaft 32 is a sprocket 33. Shaft 32 and its sprocket 33 are adjustably held in the frame members 10 and 11 by means of nuts 34, threaded on the outer ends of the shaft 32. Adjacent the opposite or rearward end of the apparatus is a second sprocket 36 made fast on a shaft 37, rotatably supported in bearings 38 and 40 carried by the channels 10 and 11. Both of the sprockets 33 and 36 are disposed midway between the channels 10 and 11, and passing thereover is a relatively heavy, endless sprocket chain 39.

Mounted on the projecting ends of the shaft 37 are sprockets 41 and 42. On the plate 13 is a gear reduction box 43 having a double ended output shaft 44. Carried on the ends of the shaft 44 are sprockets 46 and 47, in alignment with the sprockets 41 and 42. Chains 45 and 48 pass respectively over sprockets 41—46 and 42—47, and it will be apparent that the sprocket 36 is driven from shaft 44, thereby driving chain 39.

The input shaft 49 for the gear box 43 extends to the forward end of the apparatus and is provided at that end with a pulley 51. The pulley 51 is driven through a belt 52, passing over a pulley 53, likewise mounted on the shaft 27 of motor 24.

Mounted on either side of chain 39 are three releasable wire gripping units indicated generally by the numeral 54. The units 54 are identical and a description of one will suffice for all. The units 54 on a given side of the chain are spaced equidistantly from each other and it is this spacing which determines the length of the wire to be cut, as will later appear. As shown more particularly in Figs. 3, 4, and 6, each of the units 54 comprises a block 56 of metal having an elongated groove 57 in its underside. Each of the blocks 56 is secured to the chain 39 by removing one of the link pins of the chain and substituting therefor a rod 58. As shown in Fig. 5, the ends 59 of the rod project from the block 56 and extend almost to the side frame members 10 and 11. The blocks are prevented from rotating on the chains 39 by means of dowel pins 61, entering the block and the outer link of the chain.

The outer face of the block 56 is provided with hemispherical sockets 62 and 63 and is provided with an opening 64 communicating with the groove 57. Fitting within the sockets 62 and 63 are steel balls 66 and 67, and slidably mounted in the opening 64 is a pin 68, rounded on both ends. Rotatably mounted on the projecting ends 59 of the rod 58 and immediately adjacent the face of the block 56 carrying the sockets is a plate 69 having upper and lower cam surfaces 71 and 72 respectively. The member 69 is pivotally mounted on the projecting end 59 of the rod 58 and carries three hemispherical sockets 73 on the side thereof adjacent block 56, disposed to register with the sockets and hole in the block when the member 69 is turned to a certain position. Surrounding the end 59 of the rod and with one end contacting the outer face of the member 69 is a spring 74. The spring 74 is held compressed against the plate 69, its other end bearing against the side of a roller 76 mounted on the outer end of the shaft end 59.

The rollers 76 pass between upper and lower bars 77 and 78 secured to the channels 10 and 11 thus to form tracks or guides for the rollers 76. The lower flight of the chain 39 is prevented from sagging by means of a T-bar 79 supported in suitable manner from the framework of the machine.

From the foregoing description it will be apparent that as the chain 39 is driven in the direction indicated by the arrows in the several figures, the wires W from the arbors 19 and 21 are engaged within the grooves 57 of the blocks 56 as the blocks commence the lower flight at sprocket 33, it being understood that the pin 68 is withdrawn from the groove 57 due to alignment of the hole in the block 56 and a socket in member 69 as will be explained. The wires are thus automatically engaged and positioned for gripping within the groove 57 without the necessity of the chain being stopped or the necessity of slowing the same down.

Immediately to the rear of the sprocket 33 I mount a roller 81 on a pin 82 supported from the channel 10 or 11, and positioned to be struck by the lower surface 72 of the member 69. Referring more particularly to Figs. 3 and 4, it will be seen that the member 69 of the unit 54 adjacent sprocket 33 is disposed with the plate 69 in down position, whereas the unit 54 adjacent the sprocket 36 is disposed with the member 69 in up position. In the down position, the pin 68 is withdrawn, since one of the sockets 73 is in alignment with the pin 68. However, when the surface 72 is struck by the roller 81, the plate 69 is rotated counterclockwise thus forcing the pin 69 inwardly and clamping the wire. It is to be noted that the pin 68 engages the wire W beneath its center, thus forcing the wire upwardly into the top of the groove 57. The wire is thus held tightly by a pair of the grippers until the end is sheared off, thus to be drawn through the rotating arbor 19 or 21.

Immediately to the rear of the roller 81 is a cutter or knife operable to cut the wire immediately to the rear of the forwardmost block 56. As shown, the cutter comprises a knife 83. The knife 83 is made fast to one side of a body member 84 which has a spirally curved surface decreasing in radius from a point 86 clockwise about the body. At the meeting point of the surfaces of smallest and largest radii I provide an arcuate recess 87. The body 84 is mounted for rotation on a pin 88 suitably supported from the channel 10 or 11.

Pivotally mounted on a shaft 89 secured in suitable manner to the channels 10 and 11 is an arm 91. A spring 92 biases the free end of the arm 91 upwardly. Mounted for rotation in the free end of the arm is a roller 93 having the same radius as the recess 87 in the body member 84 of the cutter. The roller 93 thus fits within the recess 87 and serves to position the knife 83 correctly with respect to the block 56, and to releasably hold the same in this position in the manner to be explained later.

Mounted adjacent the sprocket 36 on a pin 94 is a roller 96. The roller 96 is disposed to be struck by the upper surface 71 of the plate 69, thereby to rotate the same clockwise as viewed in Figs. 1 and 4, thus to reregister the sockets 73 with the balls 66 and 67 and the pin 64, thereby to permit the section of wire held by the rearmost gripper to fall downwardly by gravity into a hopper 97.

In order to make certain that the wire W enters the slot 57, and also to guide the wire as it is pulled toward the rear end of the apparatus, I provide a wire positioning arm 98 immediately ahead of each cutter. The arm 98 may be pivotally mounted on the pin 89. The upper end of the arm is Y-shaped as at 99 thereby to straddle the wire W, the Y-shaped end being aligned with the slot 57. A spring 101 urges the upper end of the arm toward the wire, and a stop 102 limits upward movement thereof.

From the foregoing, the operation of my improved wire straightening and cutting machine may be now readily explained and understood. The wires W to be straightened and cut into lengths are fed from spools or rolls, not shown, through the trumpets 28, into the arbors 19 and 21, which as understood, are rotated at high speed. In the initial threading or setting of the machine, the wires are pushed manually through the arbors to within reach of the grooves 57 of the blocks 56 moving downwardly over sprocket 33. Each wire passes through the forked upper end of its associated arm 98, and thus is held for entry into the grooves 57 as the blocks 56 move around. The lower flight of the chain 39 moves to the left as viewed in Figs. 1, 3 and 4, causing the plate 69 to be rotated counterclockwise by the engagement of the surface 72 with the roller 81. This action brings the socket 73 out of alignment with the pin 64, pushing the pin inwardly, tightly gripping the wire W in the groove 57 as illustrated in Fig. 7 of the drawings. Further leftward movement of the block 56 causes the upper end of the knife 83 to be engaged by the lower rearward edge of the block 56. Continued movement of the block rotates the knife and the body member 84 counterclockwise as viewed in Fig. 3, causing the cutting edge of the knife 83 to be raised upwardly to the dotted line position indicated in Figs. 3 and 8. This causes the edge of the knife to slide upwardly against the rear side of the adjacent block 56, thus to shear the wire W. As the block moves on to the left the roller 93 is pushed out of its recess 87 by the rotary movement of the member 84, and resting on the curved surface of the member 84, causes it to make a complete revolution counterclockwise as viewed in Figs. 1, 3 and 8, thus reseating the roller 84 within the recess 87. The knife thus is reset for the next cutting operation. As the unit 54 just described engages the wire and moves farther to the left, a second gripping unit 54 on the side of the chain 39 comes into position before the first mentioned gripper contacts the roller 96 to release the wire. The second gripping unit automatically engages about the wire and the roller 81 strikes the cam surface 72, forcing the pin 68 inwardly. Further leftward movement causes the knife 83 to shear the wire at the rearward edge of the block 56, it being understood that this action takes place before the roller 96 contacts the surface 71 of the member 69 of the first described gripper to rotate it. As it is cut, the wire from the arbor is pulled to the left by the forwardmost gripping unit 54. As soon as the roller 96 contacts the surface 71 of the member 69 and rotates it, the cut section of wire is released and drops downwardly into the hopper 97 beneath the frame of the machine. From the hopper the wires may be removed in any suitable manner. The operation thus described is repeated continuously, and while they may be staggered, I purposely place the gripping and cutting units one opposite each other on the chain 39, so that the units grip and cut two lengths of wire simultaneously.

In actual operation I have found that a wire straightening and cutting machine made in accordance with my invention is entirely satisfactory in every way. I have found the same to have at least ten times the capacity of the average intermittent type of wire straightening and cutting machine commonly employed to cut blanks for coat hangers. By rotating the arbors at about 10,000 R. P. M., I am enabled to straighten wire with a lineal movement through the arbors of about 416 feet per minute, so that my machine delivers 116, 43-inch hanger blanks per minute.

It is to be especially noted that at no time during the operation does the forward motion of the wire stop or slow down. The knife cuts the wire while in motion, and the grippers take hold and release the same likewise while in full motion. It is to be noted that at no time is the wire being drawn through the arbors entirely released by all of the grippers at the same time. That is to say, either the front or rear gripper, or at least one moving from the front of the machine to the rear has hold of the wire, thus assuring that the wire is continuously fed through the apparatus. It will likewise be apparent that the length of wire to be cut is determined by the spacing of the gripping units 54, and that preferably this spacing is in turn determined by the pitch of the chain employed.

The wire positioning arm 98 permits rapid rethreading of the machine when wire from a given roll is exhausted, it only being necessary to push the wire manually through the rotating arbor far enough to lie in the Y-shaped upper end of the arm. The arm 98 likewise serves to steady the wire while it is being drawn forwardly through the arbor and while being cut.

While I have shown my invention in but one form, it will be obvious to those skilled in the art that it is not so limited, but is susceptible of various changes and modifications, without departing from the spirit thereof, and I desire, therefore, that only such limitations shall be placed thereupon as are specifically set forth in the appended claims.

What I claim is:

1. In apparatus for cutting wire into sections of predetermined length, a frame, an endless chain, a sprocket rotatably mounted on the frame supporting the chain for movement with its flights in superposed relation, forward and rear releasable wire gripping units mounted in spaced relation on the chain, means to hold the wire in position to be engaged by the gripping units, means responsive to movement of the chain causing said units to grip the wire, a rotatable knife mounted on the frame operable to cut the wire adjacent the forward gripping unit while held by said gripping units, and means responsive to movement of the chain to release the severed section of wire from the rearward gripping unit after the wire is cut by said knife.

2. In apparatus for straightening wire and cutting the same into sections of predetermined length, a pair of elongated members spaced apart to provide a frame, forward and rear sprockets mounted in the frame for rotation in a vertical plane, means to drive the rear sprocket, an endless chain passing over said sprockets, at least three wire gripping units spaced along the chain and each comprising a block, there being a groove in the bottom of the block for receiving the wire, a wire clamping member movable into the groove to contact the wire and clamp the same within the groove, a rotatable member disposed in one position to move the wire clamping member inwardly and in another position to permit the same to move out of said groove, a spring urging said rotatable member toward the block, stationary members disposed in the path of the rotatable member adjacent the commencement and end of the lower flight of said chain to move the rotatable members to wire clamping and wire releasing positions respectively, a stationary wire cutting unit embodying a rotatable knife mounted to move with one of the gripping units in shearing relation to an end portion thereof to cut the wire while the same is held by two of said wire gripping units, and a wire straightening arbor disposed adjacent the forward sprocket from which wire is drawn by said gripping units.

3. In apparatus for cutting a moving strand of wire into sections of predetermined length, a pair of spaced blocks by which the wire is engaged and pulled along, a cutter cooperable with the forwardmost block to shear the wire immediately adjacent thereto, said cutter comprising a body member mounted for rotation, the peripherical surface of said member being in the form of a spiral, a knife mounted on the spiral surface of the body intermediate the major and minor radii thereof, and resilient means to hold the body with the cutting end of the knife disposed in the path of the block whereby the cutting end of the knife moves upwardly to cut the wire responsive to rearward movement of the forwardmost block.

4. Apparatus as defined in claim 3 in which the spiral surface of the body increases in radius in the direction of rotation of said body on the wire cutting stroke, and in which said resilient means embodies a roller disposed to ride up on the portion of the spiral surface having the larger radius immediately after the body member commences to rotate.

5. In apparatus for cutting a strand of wire into sections of pre-determined length, a frame, an endless flexible member mounted on the frame, means to drive the flexible member, wire gripping units carried by the flexible member, means to hold the wire in position to be engaged by the gripping units, a rotatable cutter mounted on the frame co-acting with an end of the gripping unit and operable upon movement of the flexible member to engage and cut the wire at a point between the gripping units, and means operable responsive to movement of said flexible member to release the severed section of wire from the gripping unit engaging the same.

6. In apparatus for cutting wire into sections of predetermined length, an endless chain supported for movement with its flights in superposed relation and of a length for the lower flight to be slightly longer than the sections into which wire is to be cut, releasable wire gripping units spaced along the chain and so disposed that at least two of the same are on the lower flight at the same time, said gripping units each comprising a block member having a wire receiving groove in its lower side, an inwardly movable pin disposed to engage and clamp the wire within the groove, rotatable cam means for moving the pin into said groove, a stationary member disposed to be struck by said cam means of each gripping unit to rotate the same and engage said pin, a stationary wire cutting unit having a movable knife normally disposed in the path of the block of the forwardmost gripping unit, said knife co-acting with the rear side of the block of the forward gripping unit to engage and shear the wire responsive to rearward movement of the forwardmost gripping unit, and a stationary member disposed in the path of the rotatable cam means of the rearward gripping unit to rotate the cam means thereof and release the section of wire cut by the knife.

7. In apparatus for continuously drawing a strand of wire through a straightening arbor and cutting the same into sections of equal length, an endless chain having a lower flight extending parallel to the wire coming from the arbor, at least three wire gripping units mounted equidistantly apart on the side of the chain, each of said gripping units comprising a block having a groove on its underside for receiving the wire, a pivoted member disposed to engage the wire and position the same for entry into said grooves as the blocks commence the lower flight of the chain, means to releasably clamp the wire in said grooves, a rotatable cutter mounted to move in shearing relation to an end of the gripping units and operable to cut the wire while being held by the one of said gripping units nearest the pivoted member, and means responsive to continued movement of said chain to release the severed section of wire from the gripping unit holding the same.

8. Apparatus as defined in claim 7 in which the pivoted member is spring biased toward the wire, and in which the upper end of the pivoted member is notched to straddle the wire.

OLIVER R. BREKLE.

REFERENCES CITED

The following references are of record in the file of this patent:

UNITED STATES PATENTS

| Number | Name | Date |
| --- | --- | --- |
| 311,213 | Van Derzee | Jan. 27, 1885 |
| 359,416 | Adt | Mar. 15, 1887 |
| 664,963 | Miller | Jan. 1, 1901 |
| 2,089,564 | Magidson | Aug. 10, 1937 |
| 2,101,860 | Lewis | Dec. 14, 1937 |